US009533769B1

(12) United States Patent
Kirtz et al.

(10) Patent No.: US 9,533,769 B1
(45) Date of Patent: Jan. 3, 2017

(54) TERRAIN WARNING SYSTEMS AND METHODS

(71) Applicants: Jon E. Kirtz, Center Point, IA (US); Travis S. Vanderkamp, Marion, IA (US)

(72) Inventors: Jon E. Kirtz, Center Point, IA (US); Travis S. Vanderkamp, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 61 days.

(21) Appl. No.: 14/464,547

(22) Filed: Aug. 20, 2014

(51) Int. Cl.
G08B 23/00 (2006.01)
B64D 45/00 (2006.01)

(52) U.S. Cl.
CPC ..................... B64D 45/00 (2013.01)

(58) Field of Classification Search
CPC ....................................... B64D 45/00
USPC .............. 340/963, 970; 701/4, 9, 14; 342/29
See application file for complete search history.

(56) References Cited

U.S. PATENT DOCUMENTS

| 4,646,244 | A | * | 2/1987 | Bateman | ................ | G01C 5/005 340/963 |
| 5,798,713 | A | * | 8/1998 | Viebahn | ................ | G01C 23/005 340/973 |
| 5,945,926 | A | * | 8/1999 | Ammar et al. | ................ | 340/970 |
| 7,688,254 | B2 | | 3/2010 | Khatwa | | |
| 8,019,491 | B1 | * | 9/2011 | McCusker | ................ | 701/4 |
| 8,232,910 | B1 | * | 7/2012 | Burton | ................ | 342/29 |
| 8,554,264 | B1 | | 10/2013 | Gibbons et al. | | |
| 2002/0138194 | A1 | | 9/2002 | Flynn et al. | | |
| 2003/0156046 | A1 | * | 8/2003 | Dwyer | ................ | G01C 23/00 340/973 |
| 2004/0160341 | A1 | * | 8/2004 | Feyereisen | ............. | G01C 23/00 340/970 |
| 2006/0253231 | A1 | * | 11/2006 | Khatwa | ................ | G01C 5/005 701/9 |
| 2009/0121901 | A1 | | 5/2009 | Namier et al. | | |
| 2010/0070110 | A1 | | 3/2010 | Badli et al. | | |
| 2010/0231705 | A1 | | 9/2010 | Yahav et al. | | |

(Continued)

OTHER PUBLICATIONS

Corrected Notice of Allowance on U.S. Appl. No. 14/489,230 dated May 11, 2016, 2 pages.

(Continued)

*Primary Examiner* — Brent Swarthout
(74) *Attorney, Agent, or Firm* — Donna P. Suchy; Daniel M. Barbieri

(57) ABSTRACT

Systems and methods for use in generating alerts regarding terrain near an aircraft are provided. A method includes determining a plurality of warnings relating to terrain near an aircraft, each warning indicating terrain above a threshold elevation and having a position associated with the warning. The method further includes, for each warning, generating alert data formatted for display as an alert on a display device of the aircraft within a plan view terrain display screen on or proximate to the position associated with the warning and overlapping a visual representation of a portion of the terrain. The method further includes transmitting the alert data to the display device. A same alert shape is used for all warnings, and the alert areas of the alerts are at least partially transparent, such that the visual representations of the portions of the terrain within the alert areas are visible.

20 Claims, 4 Drawing Sheets

(56) References Cited

U.S. PATENT DOCUMENTS

2011/0184635 A1    7/2011   Khatwa et al.
2011/0313597 A1   12/2011   Wilson et al.

OTHER PUBLICATIONS

Notice of Allowance on U.S. Appl. No. 14/489,230 dated Mar. 15, 2016, 5 pages.
Non-final office action received in U.S. Appl. No. 14/489,230 dated Sep. 30, 2015, 9 pages.

* cited by examiner

TERRAIN WARNING SYSTEMS AND METHODS

BACKGROUND

The present disclosure relates generally to the field of terrain awareness for aircraft. More particularly, the present disclosure relates to systems and methods that provide alerts regarding potentially dangerous terrain near an aircraft.

Terrain awareness systems monitor terrain near an aircraft and provide information regarding terrain of potential danger to the aircraft. For instance, such systems may compare an altitude of the aircraft to elevation of terrain near the aircraft and provide an indication of terrain that has a high enough elevation to be of potential concern to the pilot. However, it may be difficult for the pilot to discern from the presented information what terrain may be of most immediate concern. Thus, there is a need for a system that provides alerts in a manner that clearly presents to the pilot the terrain upon which the pilot should be most immediately focused.

SUMMARY

One embodiment of the disclosure relates to a method including determining a plurality of warnings relating to terrain near an aircraft, each warning indicating terrain above a threshold elevation and having a position associated with the warning. The method further includes, for each warning, generating alert data formatted for display as an alert on a display device of the aircraft within a plan view terrain display screen on or proximate to the position associated with the warning and overlapping a visual representation of a portion of the terrain. The method further includes transmitting the alert data to the display device. The alert data is formatted such that: (1) the alerts have a same alert shape for all of the plurality of warnings regardless of a size and shape of the terrain associated with the warning; and (2) the alerts include an alert boundary and an alert area bounded by the alert boundary, where the alert area is at least partially transparent, such that the visual representations of the portions of the terrain within the alert area of the alerts are visible.

Another embodiment relates to a system including an electronic processor configured to determine a plurality of warnings relating to terrain near an aircraft, each warning indicating terrain above a threshold elevation and having a position associated with the warning. The electronic processor is further configured to, for each warning, generate alert data formatted for display as an alert on a display device of the aircraft within a plan view terrain display screen on or proximate to the position associated with the warning and overlapping a visual representation of a portion of the terrain. The electronic processor is further configured to transmit the alert data to the display device. The alert data is formatted such that: (1) the alerts have a same alert shape for all of the plurality of warnings regardless of a size and shape of the terrain associated with the warning; and (2) the alerts include an alert boundary and an alert area bounded by the alert boundary, where the alert area is at least partially transparent, such that the visual representations of the portions of the terrain within the alert area of the alerts are visible.

Another embodiment relates to one or more non-transitory computer-readable storage media having instructions stored thereon. The instructions are executable by one or more processors of an aircraft to determine a plurality of warnings relating to terrain near the aircraft, each warning indicating terrain above a threshold elevation and having a position associated with the warning. The instructions are further executable by the one or more processors to, for each warning: (1) generate alert data formatted for display as an alert on a display device of the aircraft within a plan view terrain display screen on or proximate to the position associated with the warning and overlapping a visual representation of a portion of the terrain, each alert including an alert boundary and an alert area bounded by the alert boundary, the alert area based on an area scanned by a terrain warning system of the aircraft; (2) determine a plurality of pixels within an alert area of the alert associated with an elevation above the threshold elevation; and (3) configure the alert data to modify a color of the plurality of pixels within the alert area based on determining that the elevation is above the threshold elevation. The instructions are further executable by the one or more processors to transmit the alert data to the display device. The alert data is formatted such that the alert area at least partially transparent, such that that the visual representations of the portions of the terrain within the alert are visible.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
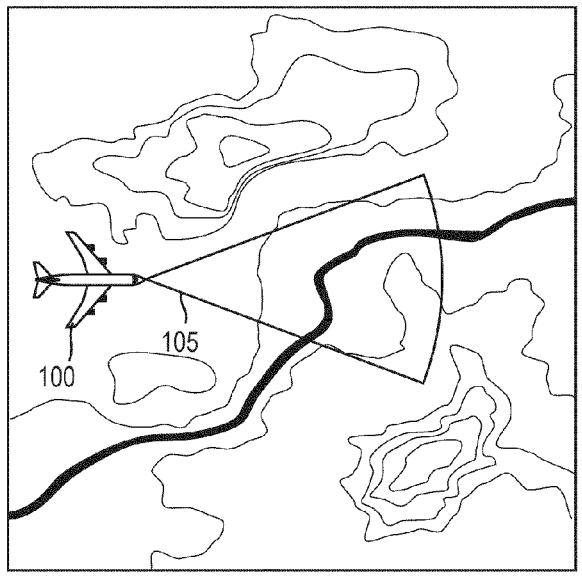
FIG. 1 is an illustration of an aircraft having a terrain awareness system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to provide alerts of potentially dangerous terrain near an aircraft are described with respect to various exemplary embodiments. During an alert from a terrain awareness system, the identification of the terrain of interest can be difficult, particularly depending on the approach used to depict the terrain. The trigger for an alert may be a single terrain cell, and identification of the terrain of interest by the size of the terrain cell alone can be difficult without some type of blooming utility, especially at a ten nautical mile range that is often used on a topographic plan view map during alerts. Even without regard for size, displaying a terrain alert while a relative terrain overlay (e.g., displaying different terrain elevation levels in different colors/shades) is "on" can cause confusion, as the colors may not be immediately distinguishable.

Some systems may highlight the terrain associated with an alert in different manners. For instance, some systems may cause the terrain associated with an alert to appear in a lower resolution, such that it appears "blocky" when overlaid against a high resolution topographic map. Some systems may cause the alerted terrain to flash to call attention to the terrain. However, some methods of calling attention to alerted terrain can obscure or otherwise impede viewing of the underlying terrain, such that a pilot may be aware of the alert, but may not know the details of the underlying terrain. Additionally, some alerts may be non-uniform in character, and may not have an immediately recognizable, consistent shape that the pilot can immediately recognize as a terrain alert.

In some embodiments, a system may determine warnings relating to terrain near an aircraft. The warnings may indicate terrain above a threshold elevation, such as terrain within a certain threshold elevation from a current altitude of the aircraft. For each warning, the system may generate alert data formatted for display on a display device as an alert. In some embodiments, the alert may be provided within a plan view display screen on or proximate to a position associated with the warning. The plan view display may be a two-dimensional horizontal view of the terrain near the aircraft. The alert may overlap a visual representation of the terrain and may be at least partially transparent, such that the terrain overlapped by the alert may be visible through the alert. A transparent (e.g., hollow) shape may allow for continued depiction of the detailed center of the alert area, such that terrain detail is not lost or substantially reduced when the alert symbol is placed on the map.

In some embodiments, a same alert shape may be used for all warnings, regardless of the size and/or shape of the terrain associated with the warning. By using a consistent shape across warnings, the alerts may be easily identifiable to a pilot and distinguishable from the other information (e.g., relative terrain data) shown on the display screen. The pilot may become trained to know and understand what the alert shape represents, and this may help avoid the pilot searching the display looking for an alert area or studying the shape of a terrain only depiction to determine an area of most immediate concern (e.g., nearest area). In some embodiments, the alert shape may be a circle, square, rectangle, triangle, trapezoid, or other similar shape.

In some embodiments, the alert data may be formatted for display as an alert having a shape representative of an area around (e.g., in front of) the aircraft being scanned by a terrain awareness system of the aircraft. Such a shape may provide the pilot with an indication of what terrain is actually being scanned. As such, the alert may indicate to the pilot that other terrain near the aircraft may also present a threat to the aircraft, but is not being scanned by the terrain awareness system (e.g., is currently outside of the alert scanning envelope). An aircraft 100 having a terrain awareness system is shown in FIG. 1 according to an exemplary embodiment. A representation of the alert envelope 105 of the terrain awareness system is also shown in FIG. 1.

It should be noted that the term aircraft, as utilized herein, may include any manned or unmanned object capable of flight. Examples of aircraft may include, but are not limited to, fixed-wing aerial vehicles (e.g., propeller-powered or jet-powered), rotary-wing aerial vehicles (e.g., helicopters), manned aircraft, unmanned aircraft (e.g., unmanned aerial vehicles, or UAVs), etc.

For the purposes of the present disclosure, the term terrain includes any type of object or obstacle that could present a risk of collision to an aircraft. Examples of terrain include, but are not limited to, ground, hills, mountains, trees, rock formations, buildings, utility/transmission towers, etc. Terrain may be naturally occurring or man-made.

Figure 2:
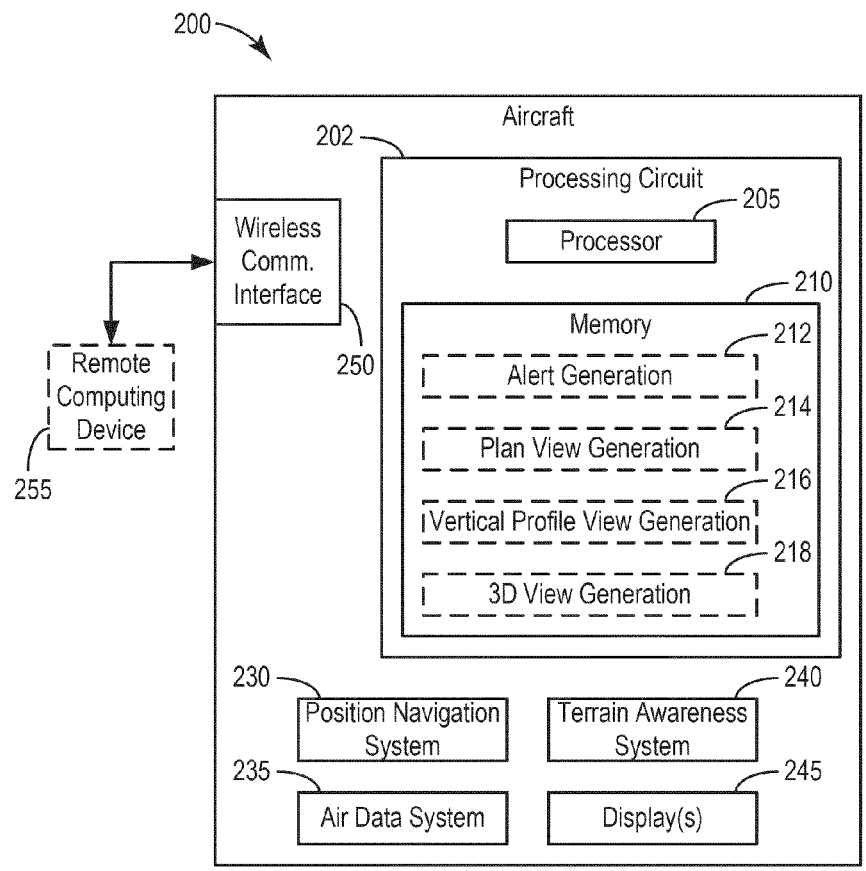
FIG. 2 is a block diagram of an aircraft configured to generate terrain alerts according to an exemplary embodiment.

Referring now to FIG. 2, a block diagram of an aircraft 200 having a processing circuit 202 for generating alert data formatted for display as alerts is shown according to an exemplary embodiment. Aircraft 200 may be any air-based platform, such as a fixed-wing or rotary-wing aircraft. Aircraft 200 includes a terrain awareness system 240 configured to collect (e.g., directly sense) data regarding one or more terrain features proximate to aircraft 200 that may pose a risk to aircraft 200. In some embodiments, terrain awareness system 240 may be or include a radar (e.g., millimeter-wave, or MMW, radar system) or LIDAR system. In some embodiments, terrain awareness system 240 may be or include a weather radar system configured to detect features of terrain around aircraft 200. In some embodiments, aircraft 200 may include one or more position/navigation systems 230, such as an onboard Embedded Global Positioning System/Inertial Navigation System (EGI). In some embodiments, aircraft 200 may include an air data system 235 (e.g., an air data computer) that may collect data regarding wind, air speed, turbulence, and/or other air-related data. Aircraft 200 may include one or more wireless communication interfaces 250 configured to allow communication with other devices/platforms. In some embodiments, aircraft 200 may transmit data to a remote computing device 255 (e.g., a computing device at a control tower) using wireless communication interface(s) 250.

Processing circuit 202 includes at least one processor 205, which may be any type of general purpose or special purpose processor (e.g., FPGA, CPLD, ASIC, etc.). Processing circuit 202 also includes at least one memory 210, which may be any type of non-transitory computer or machine-readable storage medium (e.g., ROM, RAM, hard disk, flash memory, etc.). In some implementations, all or part of processing circuit 202 may be implemented using a graphics processing unit (GPU) in aircraft 200 configured to generate display data in a format that can be interpreted by one or more display devices 245 to generate display screens.

Memory 210 may include one or more modules including instructions that may be executed by processor 205 to perform various processing functions for aircraft 200. For example, memory 210 may include an alert generation module 212 configured to generate alert data for displaying alerts within one or more types of terrain display screens on one or more display devices 245 (e.g., CRT, LCD, LED, etc.). In some embodiments (e.g., some embodiments in which terrain awareness system 240 is a commercially available or off-the-shelf terrain awareness system), alert generation module 212 may receive warnings from terrain awareness system 240 and may generate alert data based on the warnings (e.g., generate alert data formatted for display as alerts provided at a position within the screens that is based on a position associated with the warnings). In some embodiments, alert generation module 212 may be integrated with or otherwise be a part of terrain awareness system 240, and alert generation module 212 may be configured to detect alerts by comparing elevation data for terrain near the aircraft with an alert threshold.

In some embodiments, memory 210 may include one or more modules configured to generate display data formatted for display on display device(s) 245 as one or more types of terrain display screens. For instance, a plan view generation module 214 may be configured to generate a plan view display screen representing the terrain near the aircraft. In some embodiments, a vertical profile view generation module 216 may generate a vertical profile view display screen representing terrain near (e.g., in front of) the aircraft within a particular vertical slice (e.g., a vertical slice selected by the pilot within the plan view display screen). In some embodiments, a three-dimensional (3D) view generation module 218 may generate a 3D view display screen representing terrain near the aircraft within three dimensions. In other embodiments, various other types of views may be generated for display on display device(s) 245. Plan view generation module 214, vertical profile view generation module 216, and/or 3D view generation module 218 may include one or more alerts within the generated display data based on alert data generated by alert generation module 212.

Figure 3:
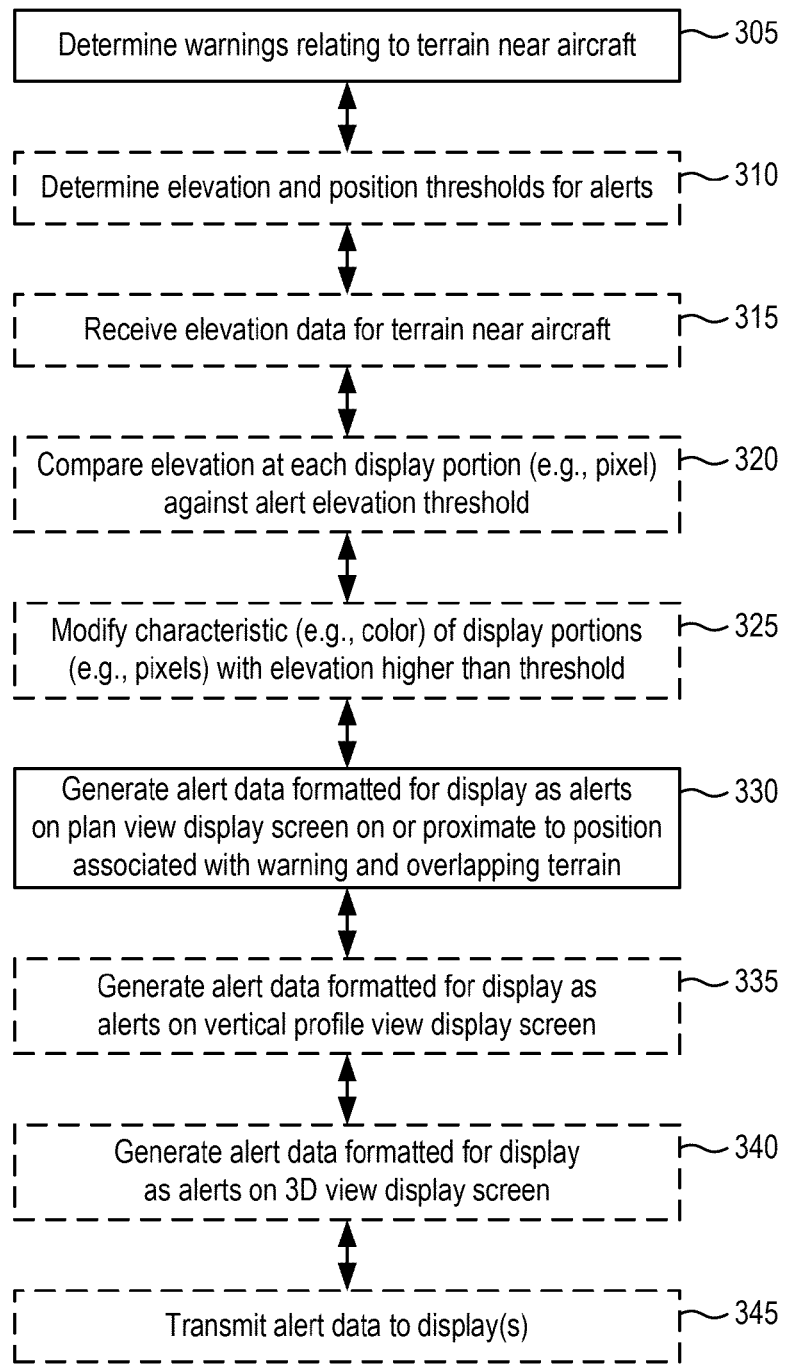
FIG. 3 is a flow diagram of a process for generating alert data formatted for display as terrain alerts on a display device according to an exemplary embodiment.

FIG. 3 illustrates a flow diagram of a process 300 for generating alert data formatted for display as terrain alerts on a display device according to an exemplary embodiment. Referring now to both FIGS. 2 and 3, processing circuit 202 may determine one or more warnings relating to terrain near aircraft 200 (305). Processing circuit 202 may receive the warnings from terrain awareness system 240. In some embodiments, terrain awareness system 240 may compare terrain elevation data for all terrain within a scan area (e.g., an FLTA, or Forward Looking Terrain Avoidance, envelope) to a threshold elevation, and may generate warnings for one or more terrain portions having an elevation higher than the threshold elevation. In some embodiments, a FLTA envelope may be utilized in accordance with TSO-C 151 (e.g., TSO-C 151c). In some embodiments, the threshold elevation may be an absolute elevation value. In some embodiments, the threshold elevation may be relative to a current altitude of the aircraft. For instance, in some embodiments, the threshold elevation may be a predetermined distance below the current altitude of the aircraft (e.g., 300 feet below the current altitude). In some embodiments, the threshold elevation may include elevations near (e.g., within a predetermined distance below) a set value, such as a set distance below a current elevation of the aircraft. For instance, if a warning elevation is set at 1000 feet below an aircraft, the threshold for providing warnings may be set to 200 feet below the warning elevation, which may help warn the pilot of terrain not only above the 1000 foot level but also near that level. In some embodiments, terrain awareness system 240 may generate warning data that indicates all portions of the terrain within the scan area that has an elevation above the threshold elevation.

In some embodiments, the warning data generated by terrain awareness system 240 may not indicate all terrain within the scan area having an elevation above the threshold elevation. For instance, terrain awareness system 240 may generate warnings indicating a single point of concern (e.g., single position) with respect to the warning, such as a center of a terrain cell of concern.

In some embodiments, processing circuit 202 may determine terrain to emphasize within an alert area based on warnings received from terrain awareness system 240. Processing circuit 202 may determine elevation and/or position thresholds for alerts (310). In some embodiments, the elevation and position thresholds may be stored within memory 210 and/or may be received from terrain awareness system 240. For instance, in some embodiments, the position threshold may include any positions within an area bounded by a boundary of the alert. In some such embodiments in which the alert is a predetermined shape, such as a circle, square, etc., the position threshold may include any positions within the area to be bounded by the alert within the display screen(s). For instance, for a circular alert, the position threshold may be a threshold radius around a position associated with the warning. In some embodiments, such as embodiments in which the alert area is representative of the scan area of terrain awareness system 240, the position threshold may include any positions within the scan area.

Processing circuit 202 may receive elevation data for terrain near aircraft 200 (315). The elevation data may be generated by terrain awareness system 240, and may be stored within a terrain database associated with terrain awareness system 240 and/or processing circuit 202. In some embodiments, the terrain database may be stored within memory 210 or in a memory associated with terrain awareness system 240. In some embodiments, the elevation data may also include pre-generated elevation data stored within the terrain database and/or within a separate topographic database. The elevation data may be represented using any sort of data structure (e.g., lookup table, linked list, etc.) capable of correlating positions elevations, such that an elevation at a particular position can be determined from the elevation data.

Processing circuit 202 may compare the elevation at each display portion (e.g., pixel, group of pixels, etc.) within the alert area against the alert elevation threshold (320). In some embodiments, elevation data may be available for each pixel to be displayed within a display screen, and processing circuit 202 may compare the elevation associated with each pixel to the threshold elevation to determine which pixels are associated with terrain having an elevation above the threshold. Processing circuit 202 may generate display data configured to modify a characteristic of the display portions with elevations higher than the threshold. For instance, processing circuit 202 may modify a color of the pixels having the elevations higher than the threshold elevation. In one such embodiment, processing circuit 202 may change the color of pixels having the elevations higher than the threshold elevation to match a color of a border of the alert. For instance, if high risk terrain is represented in a mid-tone red within a topography map shown in a display image, and alerts are represented using a bright red border, processing circuit 202 may modify those portions of the high risk terrain appearing within the alert border to have a bright red color matching the alert border. Modifying the color in this fashion may help make it apparent to the pilot that this terrain is associated with the alert.

Processing circuit 202 may generate alert data formatted for display as alerts within a display screen on or proximate to a position associated with the warnings upon which the alerts are based (330). The alerts may overlap terrain shown on the display screen. In some embodiments, the alert data may be formatted for display as alerts within a plan view display screen displayed on display device(s) 245.

The alerts may be at least partially transparent, such that the underlying terrain is still visible through the alert. In some embodiments, the alert may include an alert boundary (e.g., border) surrounding an alert area associated with the alert, and the area bounded by the border may be hollow, or completely transparent. In some embodiments, the area bounded by the boundary may be partially transparent. For instance, the area may be shaded to call further attention to the presence of the alert, but may still be partially transparent so the underlying terrain remains visible. In some embodiments, stippling or other types of visual effects allowing for the underlying terrain to be seen through the alert may be utilized.

In some embodiments, the same shape may be used for all of the warnings, regardless of the size and/or shape of the terrain associated with the warnings. For instance, a same shape may be used for a warning associated with a large area of high risk terrain as for a small area of high risk terrain. In some such implementations, various aspects of the alert may change, such as size, dimensions of individual portions, angles between lines, etc. may vary, but the primary type of shape may stay the same. In some embodiments, the shape of the alert may be a circle, square, triangle, trapezoid, rectangle, or any other type of shape. In some embodiments, the shape may be centered around a position associated with the warning. In some embodiments, the shape may be centered around or proximate to a position of greatest immediate concern (e.g., a high elevation terrain portion closest to a current position of the aircraft). In some embodiments, all of the alerts may have a same size.

In some embodiments, the shape of the alert may be configured to represent a scan area of terrain awareness system 240. In some such embodiments, the area of the scan envelope and the displayed alert area/border may vary based on aircraft conditions, such as ground speed and/or rate of turning. For instance, the scan area may be larger/longer when the ground speed is higher (e.g., to provide a consistent look-ahead window/time) than when the ground speed is lower. The scan area may be expanded to a side to which an aircraft is turning and/or contracted on an opposite side when the aircraft turns, and such expanding/contracting may occur as a function of the rate of turning (e.g., if the turning is happening at a higher rate, the scan area may be expanded further than for a lower rate). Such a shape may provide the pilot with a sense of what terrain has been scanned, which may provide situational awareness with respect to terrain lateral to the aircraft. In some embodiments, the scan area may always be displayed to provide awareness of the scan area. In some such embodiments, the shape may be shown in a non-alerting color (e.g., nearly transparent) when not actively highlighting an alert so as to not distract or confuse the pilot. In some embodiments, the shape may be a test flight function that can be activated by a configuration parameter.

In some embodiments, processing circuit 202 may generate alert data causing display of alerts having multiple warning levels. For instance, processing circuit 202 may provide a first alert portion associated with a higher risk level, such as a warning alert portion (e.g., higher elevation and/or closer to the aircraft) and a second alert portion associated with a lower risk level, such as a caution alert portion (e.g., lower elevation and/or further away from the aircraft). In one such embodiment, the higher-risk area may be shown in one color (e.g., red), and the lower-risk area may be shown in another color (e.g., yellow). In some embodiments, at least a portion of the lower-risk area may be further away from the aircraft and/or have a lower elevation than at least a portion of the higher-risk area.

In some embodiments, processing circuit 202 may generate alert data causing display of alerts within one or more vertical profile view display screens (335). In some such embodiments, the pilot may select a direction within a plan view display screen (e.g., a vertical slice intersecting a terrain cell of concern to the pilot), and a vertical profile view display screen along the selected direction may be generated. In some embodiments, the direction may be selected (e.g., automatically) based on a current aircraft track or heading. In some embodiments, alert data may be generated to display alerts for the warnings within the vertical profile view display screen. In some such embodiments, a position and/or length of the alerts shown within the vertical profile view display screen may be based on the position and/or length of the alerts as shown in the plan view display screen. This may help the displayed alerts between the screens to appear consistent to the pilot and avoid confusion.

In some embodiments, processing circuit 202 may generate alert data causing display of alerts within one or more 3D view display screens (340). The 3D view display screens may provide a three-dimensional representation of the terrain around (e.g., in front of) aircraft 200. In some embodiments, the 3D view screens may mimic a view of the terrain from the cockpit of aircraft 200, and/or may provide data regarding the terrain (e.g., elevation data, such as a difference between the current aircraft altitude and the elevation of the represented terrain; it should be noted that such information may be displayed in any of the generated screens). In various embodiments, two-dimensional and/or three-dimensional representations of the alerts may be shown within the 3D view display screens.

Once the alert/display data has been generated, processing circuit 202 may transmit the alert/display data to display device(s) 245 for presentation (345).

Figures 4, 5:
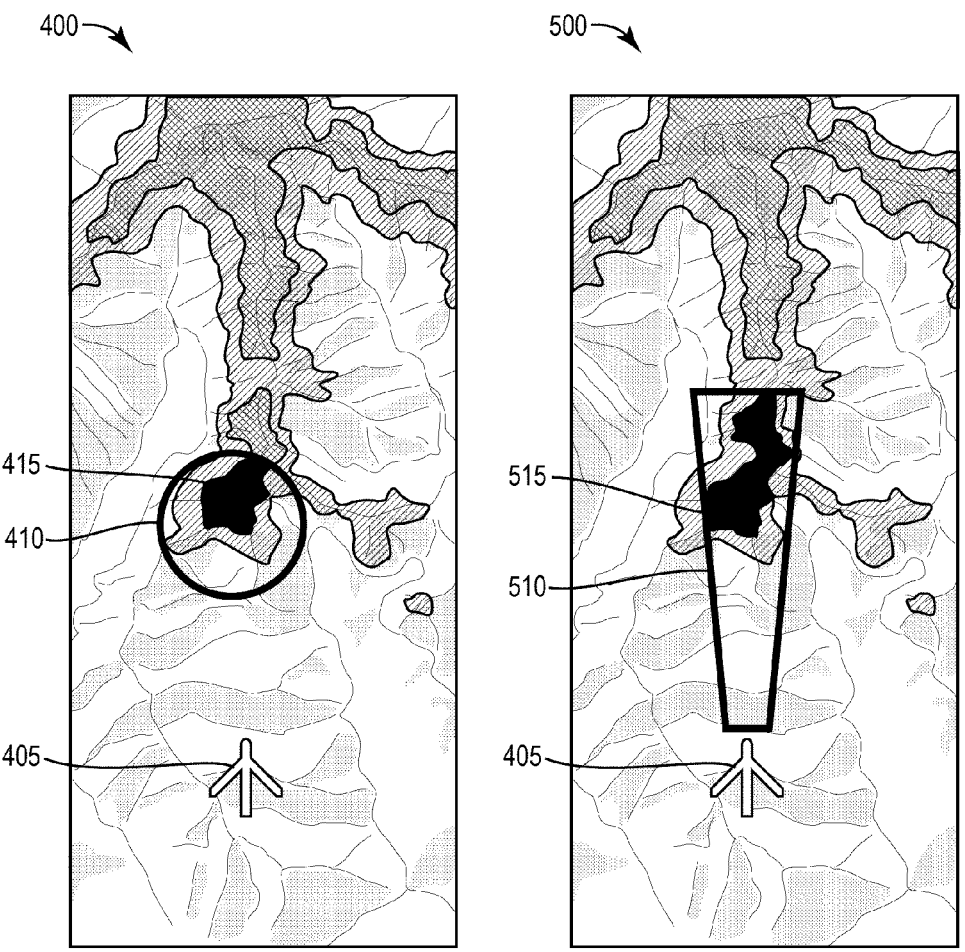
FIG. 4 is an illustration of a plan view display screen showing a first type of terrain alert according to an exemplary embodiment.
FIG. 5 is an illustration of a plan view display screen showing a second type of terrain alert according to an exemplary embodiment.

FIGS. 4 through 9 provide illustrative display screens that may be generated based on alert/display data generated by processing circuit 202, according to exemplary embodiments. Referring now specifically to FIG. 4, a plan view display screen 400 is shown that includes an aircraft icon 405 representing a current position of the aircraft and an alert 410 highlighting terrain of potential risk to the aircraft. In the illustrated embodiment, alert 410 has a circular shape. In some such embodiments, a size and/or shape of the alerts may be the same for all generated warnings. Plan view display screen 400 also illustrates a high risk terrain portion 415 associated with terrain above a threshold elevation that is within a boundary of alert 410. In various embodiments, an appearance of high risk terrain portion 415 may be modified in one or more of a variety of ways, such as by modifying a color, size, shading, etc. of the terrain, causing the terrain to blink/flash, etc. In one such embodiment, a color of high risk terrain portion 415 may be modified to differentiate from the other high-elevation terrain displayed within the topographic map shown in FIG. 4 (e.g., to match a color of alert 410).

FIG. 5 illustrates another plan view display screen 500 including an alert 510 having a shape based upon a scan area of the terrain awareness system according to an exemplary embodiment. In the illustrated embodiment, the same terrain is shown as was shown in FIG. 4. However, the alert 510 covers a different area than alert 410, and a different high risk terrain portion 515 appears within the alert area and is visually modified.

Figure 6:
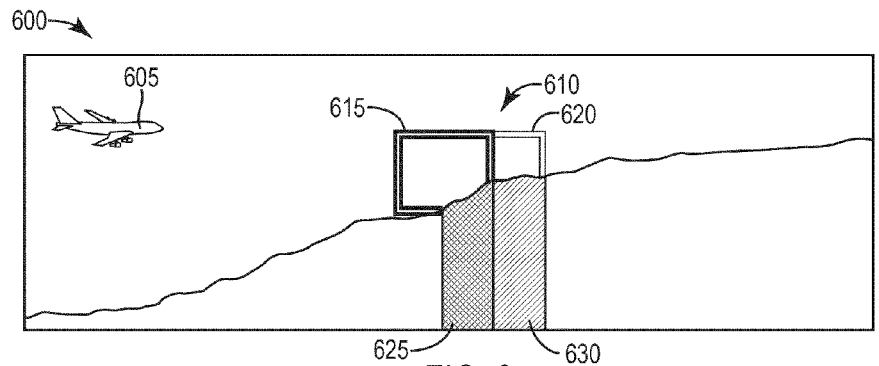
FIG. 6 is an illustration of a vertical profile view display screen showing a first type of terrain alert with two alert levels according to an exemplary embodiment.
Figure 7:
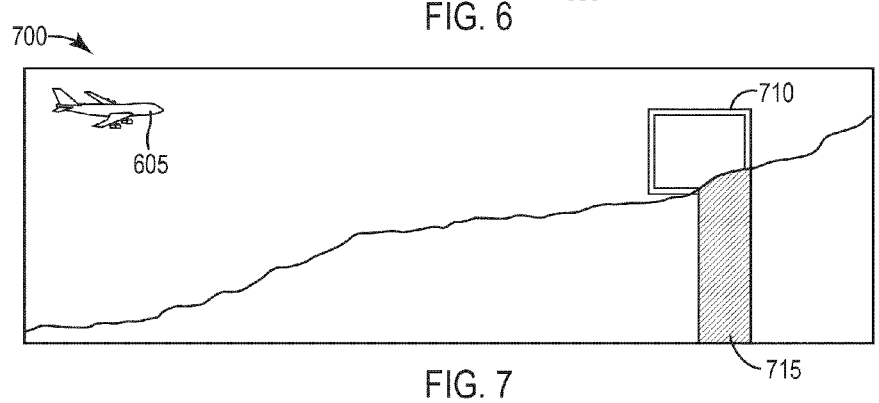
FIG. 7 is an illustration of a vertical profile view display screen showing the first type of terrain alert with a single alert level according to an exemplary embodiment.

FIGS. 6 and 7 illustrate vertical profile view display screens 600 and 700, respectively, that include alert data. Vertical profile view display screens 600 and 700 may be screens generated based on a vertical slice selected from plan view display screen 400.

Referring specifically to FIG. 6, screen 600 includes an aircraft icon 605 based on a position of the aircraft and an alert 610. In the illustrated embodiment, alert 610 includes a high risk alert portion 615 (e.g., representing terrain closer to the aircraft) and a low risk alert portion 620 (e.g., representing terrain further away from the aircraft). In some embodiments, a portion of the terrain associated with alert 610 may be modified in appearance. For instance, in the illustrated embodiment, a high risk terrain portion 625 has one type of visual representation differentiating portion 625 from the other terrain, and a low risk terrain portion 630 has another type of visual representation differentiating portion 630 from the other terrain. In one embodiment, portion 625 may be colored red, and portion 630 may be colored yellow. In some embodiments, high risk terrain portion 625 may be colored, shaded, etc. to match high risk alert portion 615, and low risk terrain portion 630 may be colored, shaded, etc. to match low risk alert portion 620.

Screen 700 of FIG. 7 shows an embodiment in which an alert 710 having a single alert level (e.g., a caution level) is displayed. In the illustrated embodiment, terrain portion 715 associated with alert 710 is also visually modified to show the terrain associated with alert 710.

Figure 8:
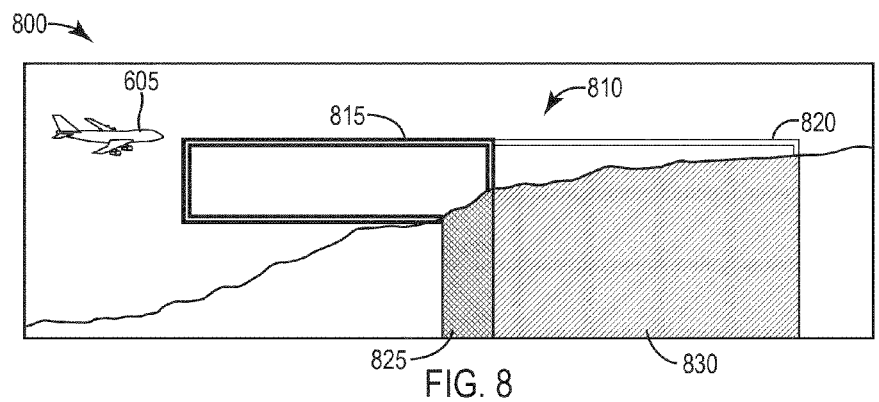
FIG. 8 is an illustration of a vertical profile view display screen showing a second type of terrain alert with two alert levels according to an exemplary embodiment.
Figure 9:
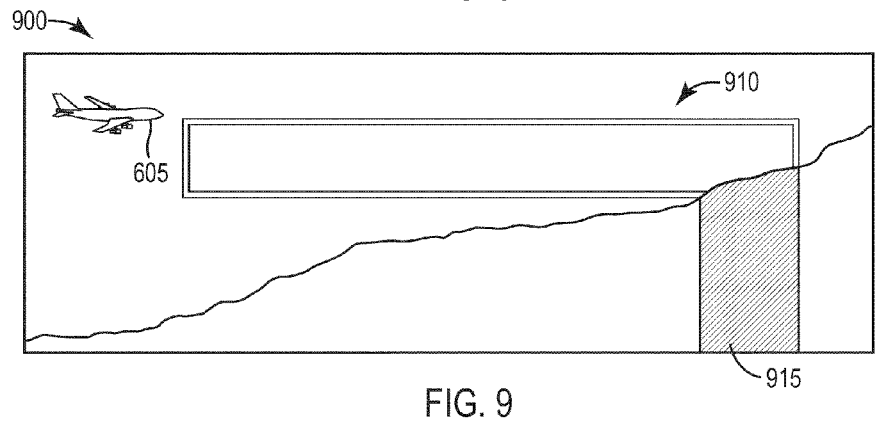
FIG. 9 is an illustration of a vertical profile view display screen showing the second type of terrain alert with a single alert level according to an exemplary embodiment.

FIGS. 8 and 9 illustrate vertical profile view display screens 800 and 900, respectively, that include alert data. Vertical profile view display screens 800 and 900 may be screens generated based on a vertical slice selected from plan view display screen 500, and may include alerts having a shape based on a scan area of the terrain awareness system.

Referring specifically to FIG. 8, screen 800 includes an alert 810 that has a high risk alert portion 815 (e.g., representing terrain closer to the aircraft) and a low risk alert portion 820 (e.g., representing terrain further away from the aircraft). A high risk terrain portion 825 has one type of visual representation differentiating portion 825 from the other terrain, and a low risk terrain portion 830 has another type of visual representation differentiating portion 830 from the other terrain. In one embodiment, portion 825 may be colored red, and portion 830 may be colored yellow. In some embodiments, high risk terrain portion 825 may be colored, shaded, etc. to match high risk alert portion 815, and low risk terrain portion 830 may be colored, shaded, etc. to match low risk alert portion 820.

Screen 900 of FIG. 9 shows an embodiment in which an alert 910 having a single alert level (e.g., a caution level) is displayed. In the illustrated embodiment, terrain portion 915 associated with alert 910 is also visually modified to show the terrain associated with alert 910.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
   determining a plurality of warnings relating to terrain near an aircraft, each warning indicating terrain above a threshold elevation and having a position associated with the warning;
   for each warning, generating alert data formatted for display as an alert on a display device of the aircraft within a plan view terrain display screen on or proximate to the position associated with the warning and overlapping a visual representation of a portion of the terrain including a terrain contour line indicating a transition from a portion of terrain having a first elevation above the threshold elevation to a portion of terrain having a second elevation below the threshold elevation; and
   transmitting the alert data to the display device;
   wherein the alert data is formatted such that:
      the alerts have a same alert shape for all of the plurality of warnings regardless of a size and shape of the terrain associated with the warning; and
      the alerts comprise an alert boundary and an alert area bounded by the alert boundary, the alert area including the terrain contour line, and the alert area at least partially transparent such that the visual representations of the portions of the terrain within the alert area of the alerts are visible, the alerts have a same alert shape for all of the plurality of warnings regardless of a size and shape of the terrain associated with the warning.

2. The method of claim 1, wherein generating the alert data comprises, for each warning, formatting the alert data for display as a circular alert centered around the position associated with the warning.

3. The method of claim 2, wherein the alert data is formatted such that the circular alerts for all of the plurality of warnings have a same size.

4. The method of claim 1, wherein generating the alert data for each warning comprises formatting the alert data for display as a scan area alert, the alert area of each scan area alert representative of an area scanned by a terrain awareness system of the aircraft.

5. The method of claim 4, wherein the scan area alert comprises a first alert area and a second alert area indicating a lower warning severity than the first alert area, wherein at least a portion of the second alert area is at least one of:
   further away from the aircraft than at least a portion of the first alert area; or
   at a lower altitude than at least a portion of the first alert area.

6. The method of claim 4, wherein generating the alert data comprises varying the alert area based on a ground speed of the aircraft.

7. The method of claim 6, wherein generating the alert further comprises varying the alert area based on a turn rate of the aircraft.

8. The method of claim 1, wherein generating the alert data further comprises, for each warning:
   determining a plurality of display portions within the alert area of the alert having an elevation above the threshold elevation; and
   modifying a characteristic of the plurality of display portions within the alert area based on determining that the elevation is above the threshold elevation.

9. The method of claim 8, wherein the plurality of display portions comprise a plurality of pixels, and wherein modifying the characteristic comprises modifying a color of the plurality of pixels.

10. The method of claim 1, wherein generating the alert data comprises, for each warning, formatting the alert data to also provide a representation of the alert within a vertical profile view screen, the representation based on a length of the alert displayed within the plan view display screen.

11. A system comprising:
   an electronic processor configured to:
      determine a plurality of warnings relating to terrain near an aircraft, each warning indicating terrain above a threshold elevation and having a position associated with the warning;
      for each warning, generate alert data formatted for display as an alert on a display device of the aircraft within a plan view terrain display screen on or proximate to the position associated with the warning and overlapping a visual representation of a portion of the terrain including a terrain contour line indicating a transition from a portion of terrain having a first elevation above the threshold elevation to a portion of terrain having a second elevation below the threshold elevation; and
      transmit the alert data to the display device;
      wherein the alert data is formatted such that:

the alerts have a same alert shape for all of the plurality of warnings regardless of a size and shape of the terrain associated with the warning; and the alerts comprise an alert boundary and an alert area bounded by the alert boundary, the alert area including the terrain contour line and at least a portion of the terrain having the first elevation above the threshold elevation and at least a portion of the terrain having the second elevation below the threshold elevation, and the alert area at least partially transparent such that the visual representations of the portions of the terrain within the alert area of the alerts are visible.

12. The system of claim 11, wherein the electronic processor is configured to, for each warning, format the alert data for display as a circular alert centered around the position associated with the warning.

13. The system of claim 12, wherein the alert data is formatted such that the circular alerts for all of the plurality of warnings have a same size.

14. The system of claim 11, wherein the electronic processor is configured to, for each warning, format the alert data for display as a scan area alert, the alert area of each scan area alert representative of an area around the aircraft scanned by a terrain awareness system of the aircraft.

15. The system of claim 14, wherein the scan area alert comprises a first alert area and a second alert area indicating a lower warning severity than the first alert area, wherein at least a portion of the second alert area is at least one of:
further away from the aircraft than at least a portion of the first alert area; or
at a lower altitude than at least a portion of the first alert area.

16. The system of claim 11, wherein the electronic processor is configured to, for each warning, generate the alert data by:
determining a plurality of display portions within the alert area of the alert having an elevation above the threshold elevation; and
modifying a characteristic of the plurality of display portions within the alert area based on determining that the elevation is above the threshold elevation.

17. The system of claim 16, wherein the plurality of display portions comprise a plurality of pixels, and wherein modifying the characteristic comprises modifying a color of the plurality of pixels.

18. The system of claim 11, wherein the electronic processor is configured to, for each warning, format the alert data to also provide a representation of the alert within a vertical profile view screen, the representation based on a length of the alert displayed within the plan view display screen.

19. One or more non-transitory computer-readable storage media having instructions stored thereon, the instructions being executable by one or more processors of an aircraft to:
determine a plurality of warnings relating to terrain near the aircraft, each warning indicating terrain above a threshold elevation and having a position associated with the warning;
for each warning:
generate alert data formatted for display as an alert on a display device of the aircraft within a plan view terrain display screen on or proximate to the position associated with the warning and overlapping a visual representation of a portion of the terrain including a terrain contour line indicating a transition from a portion of terrain having a first elevation above the threshold elevation to a portion of terrain having a second elevation below the threshold elevation, each alert including an alert boundary and an alert area bounded by the alert boundary, the alert area including the terrain contour line, the alert area based on an area scanned by a terrain awareness system of the aircraft;
determine a plurality of pixels within an alert area of the alert associated with the first elevation above the threshold elevation; and
configure the alert data to modify a color of the plurality of pixels within the alert area based on determining that the first elevation is above the threshold elevation; and
transmit the alert data to the display device;
wherein the alert data is formatted such that the alert area is at least partially transparent such that that the visual representations of the portions of the terrain within the alert are visible.

20. The one or more non-transitory computer-readable storage media of claim 19, wherein the scan area alert comprises a first alert area and a second alert area indicating a lower warning severity than the first alert area, wherein at least a portion of the second alert area is at least one of:
further away from the aircraft than at least a portion of the first alert area; or
at a lower altitude than at least a portion of the first alert area.

* * * * *